Nov. 17, 1925.
C. H. OAKLEY
1,562,040
HALF SOLE
Filed May 21, 1921
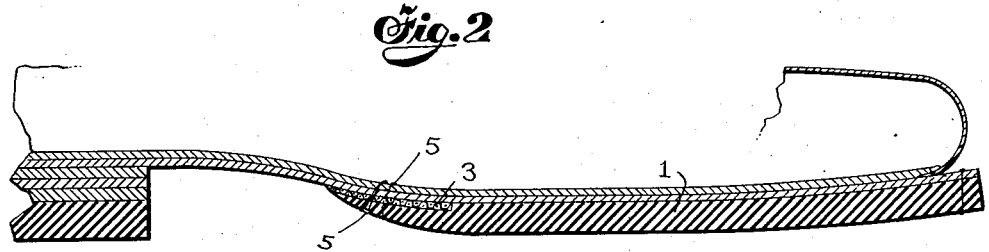
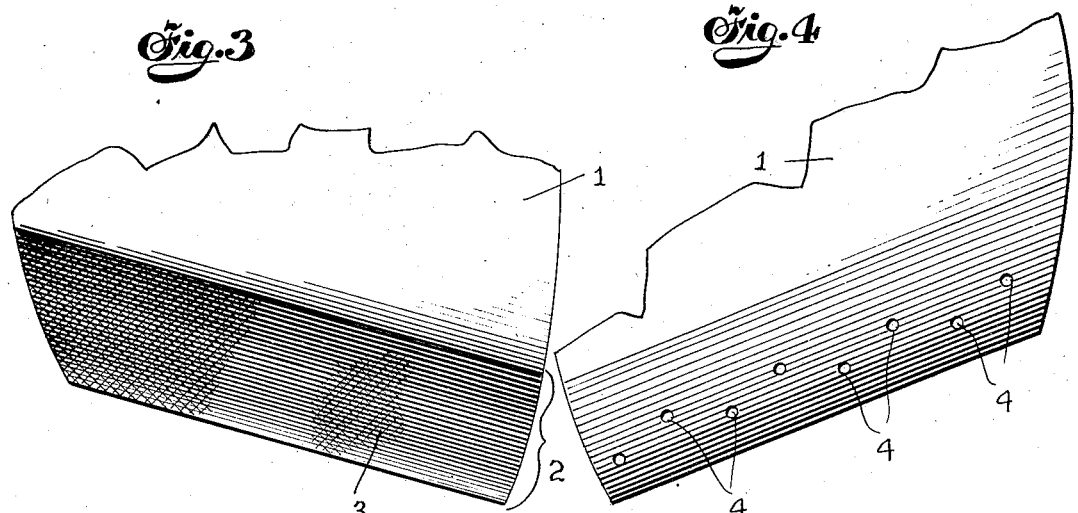
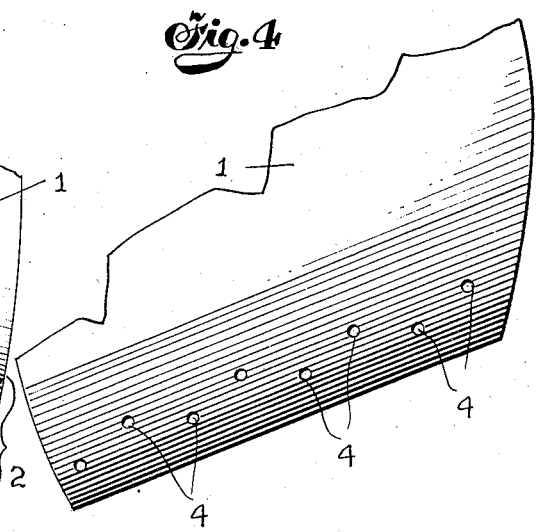
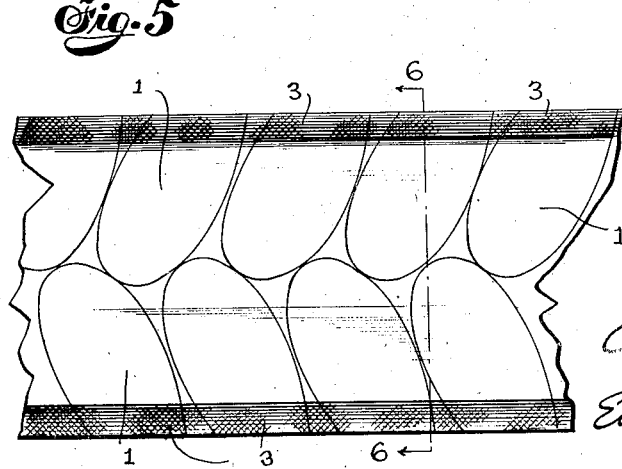
INVENTOR
Clifford H. Oakley
BY
Emery Varney Blair & Hoguet
ATTORNEYS Patented Nov. 17, 1925.

1,562,040

UNITED STATES PATENT OFFICE.

CLIFFORD H. OAKLEY, OF TRENTON, NEW JERSEY.

HALF SOLE.

Application filed May 21, 1921. Serial No. 471,473.

*To all whom it may concern:*

Be it known that I, CLIFFORD H. OAKLEY, a citizen of the United States, and a resident of the city of Trenton, county of Mercer, and State of New Jersey, have invented an Improvement in Half Soles, of which the following is a specification.

This invention relates to improvements in the construction of what are commonly known as tap soles or half soles of rubber or suitable composition. An object of the invention is to provide a construction for tap soles whereby the rear edge which is commonly nailed to the shank of the shoe may be securely held to the shoe and held in such a manner that a permanently tight joint between the rear edge of the tap sole and the shank of the shoe will be formed.

In the use of tap soles or half soles of rubber or other similar or suitable composition, not a little difficulty has been experienced in properly securing the rear edge of the tap sole to the shank of the shoe. It is oftentimes as advantageous to use a rubber or composition half sole instead of a leather half sole, but their use is restricted at least in part by the difficulty just mentioned.

The accompanying drawings show a preferred embodiment of the present invention for purposes of illustration, and therein, Figure 1 is a longitudinal section of a tap sole, Figure 2 is a similar view showing the sole attached to a shoe, Figure 3 is a top plan view of the rear edge of the tap sole, Figure 4 is a bottom plan view, and Figure 5 is a somewhat diagrammatic figure which will be referred to in speaking of a method of manufacture of this tap sole.

Figure 6 is a section on the line 6—6 of Figure 5.

The drawings show a tap sole or half sole 1 which may be made of any suitable material such as rubber, rubber composition or other pressed or vulcanized compositions which are commonly used for this purpose. The larger part of the sole is molded flat, but the rear edge 2 is molded with a decided upward curve as clearly shown in Figure 1. In order to form a neat appearing fit with the shank of the shoe the rubber is thinned toward the rear edge of the sole.

Preferably, along the upper side of the rear edge portion a strip of fabric 3 such as duck or heavy canvas, is vulcanized into the rubber, or other composition, under pressure so that it is securely attached thereto and is embedded therein at least to the thickness of the material. On the under side of this curved portion of the tap sole a number of indentations 4, 4 are formed, so that the cobbler who attaches the sole will have clearly indicated to him the number of nails necessary to hold the tap to the shoe.

Figure 2 will serve to illustrate the manner in which the tap sole is applied to the shoe. Ordinarily and preferably, the sole is sewed around the marginal edges but obviously cannot be sewed across the rear edge.

It will be observed that when the tap sole is first applied to the shoe and before it is nailed, the rear edge portion thereof will contact with the shank along the extreme rear edge of the tap and also along a line which follows the forward edge of the fabric reinforcement more or less exactly. There is thus formed an arch of reinforced composition which is relatively thick at the forward line of contact and relatively thin at the rear line of contact with the shoe. The under side of this arch is rendered practically non-extensible by the fabric strip 3, consequently as the arch is flattened by driving the nails 5—5 therethrough, the force tending to stretch the non-extensible reinforced surface is translated into a force tending to compress the rubber structure adjacent to and intimately attached to it. Because of the resiliency of the material the tap tends to resume its original molded form and this tendency will act continually to hold the extreme rear edge of the tap firmly against the shank of the shoe, while the fabric 3 through which the nails have been passed, will prevent the nails from tearing out of the rubber or other composition.

Tap soles embodying the invention may be manufactured in the usual manner, that is, by molding them in individual mold cavities but I prefer to manufacture these tap soles as long strips, the edges of which are upturned and if desired, reinforced with fabric as shown in Figures 5 and 6. Then the shoemaker may cut from this strip such pieces of such size as he may need somewhat as indicated in Figure 5.

The invention may be variously modified and embodied within the scope of the subjoined claim.

I claim as my invention:—

As an article of manufacture, tap sole material comprising a strip of molded composition, each longitudinal edge being curved and bevelled and having a strip of fabric embedded therein on the inner face of the curved portion substantially as described.

In testimony whereof, I have signed my name to this specification this 17th day of May, 1921.

CLIFFORD H. OAKLEY.